Oct. 1, 1968

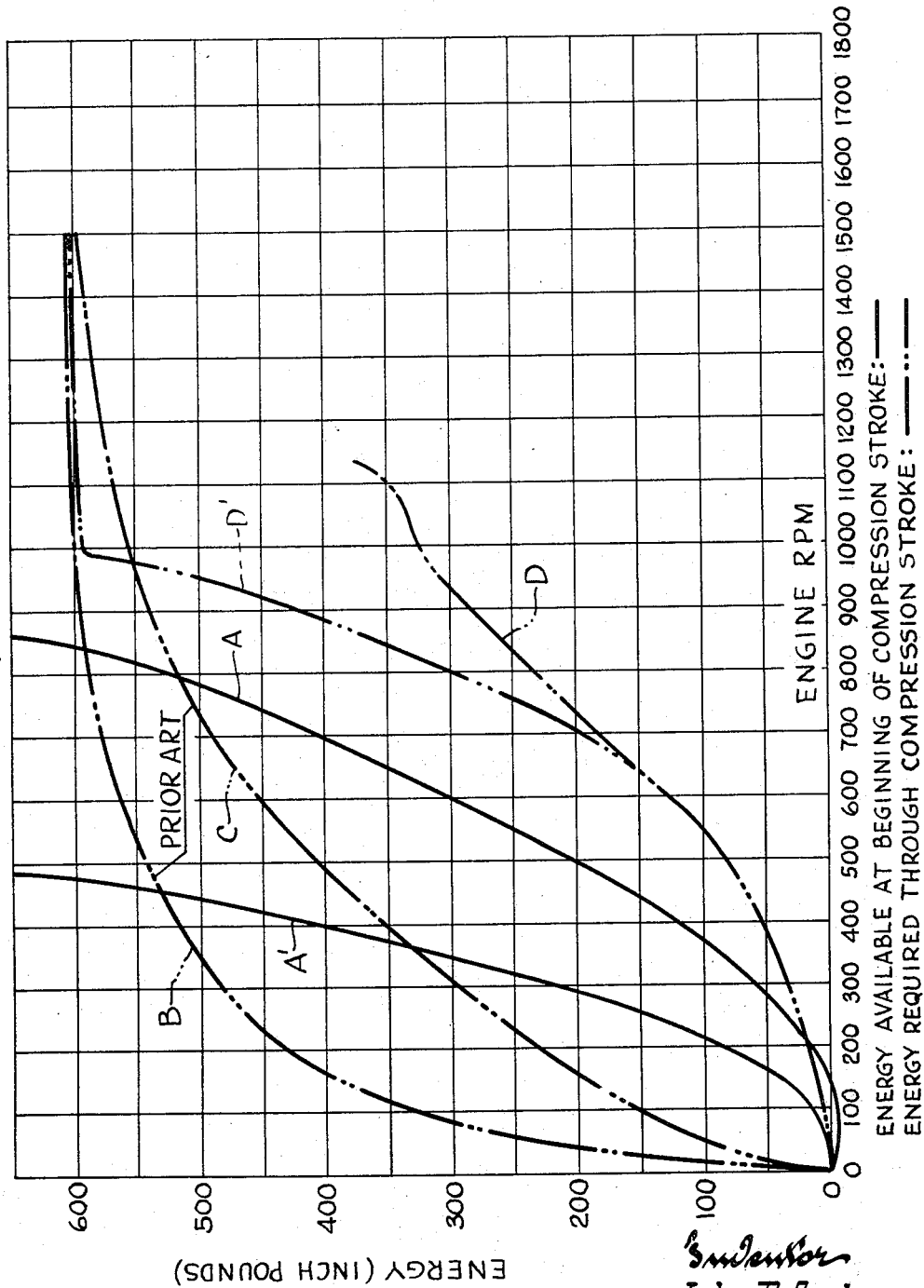

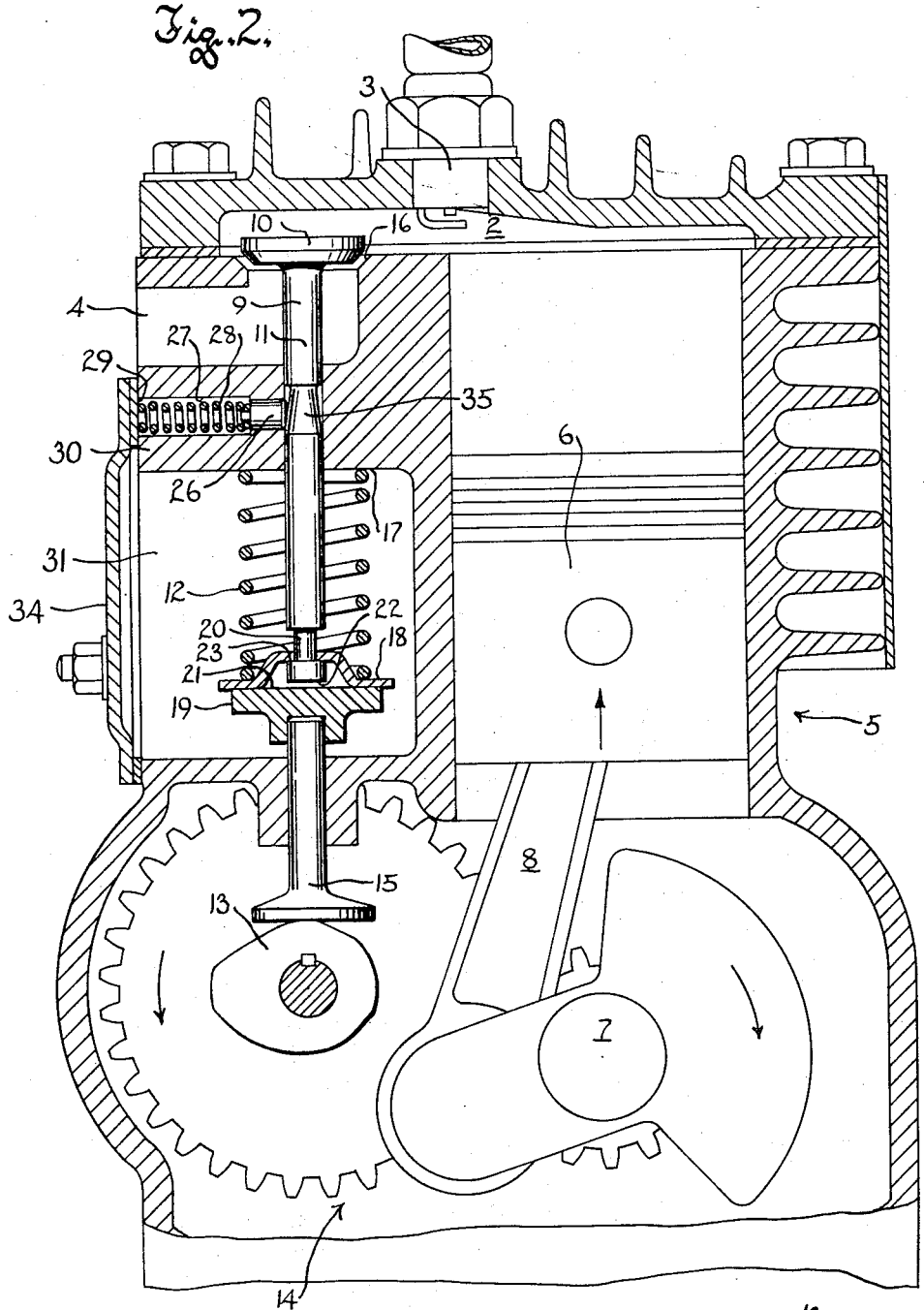

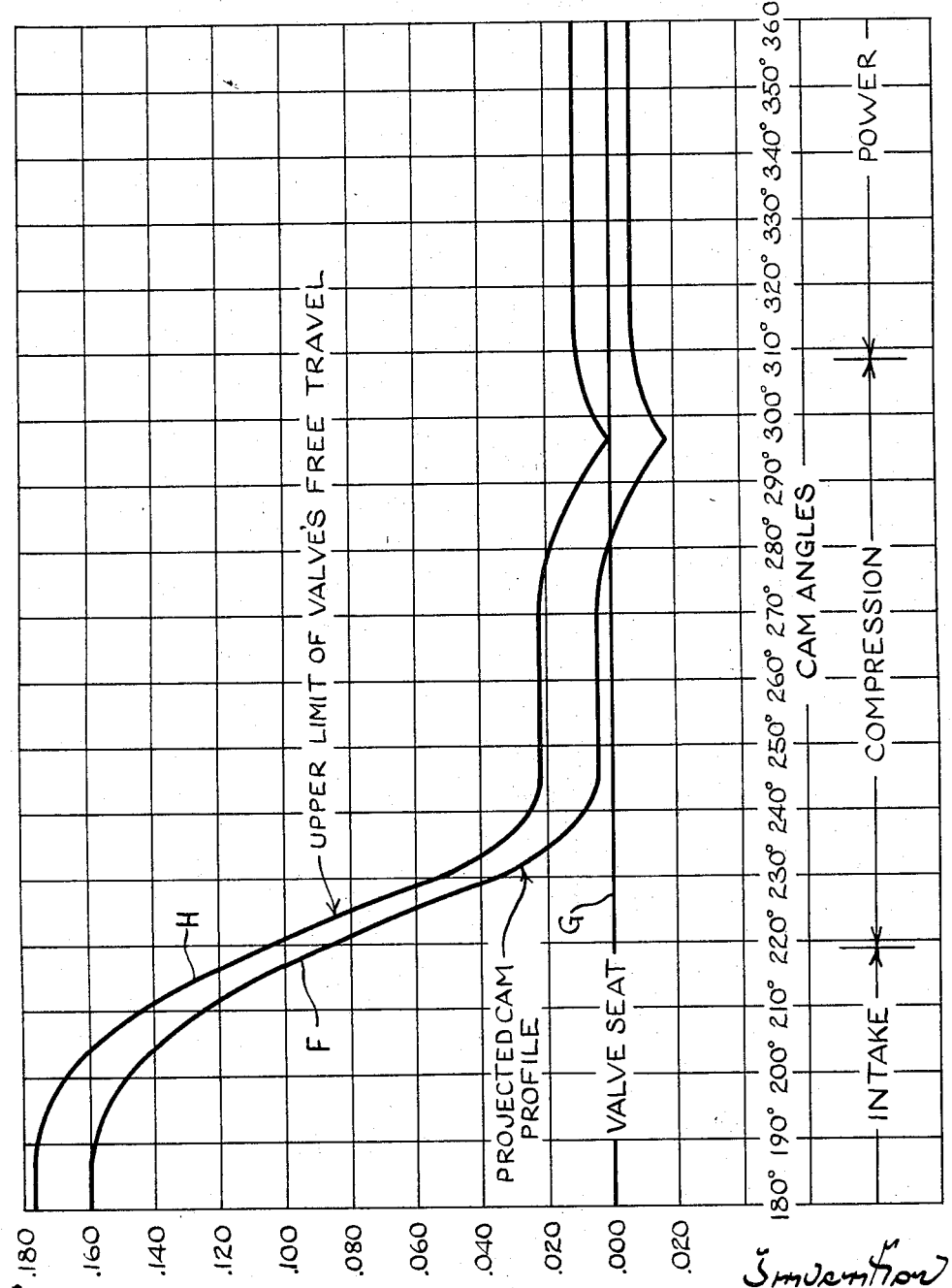

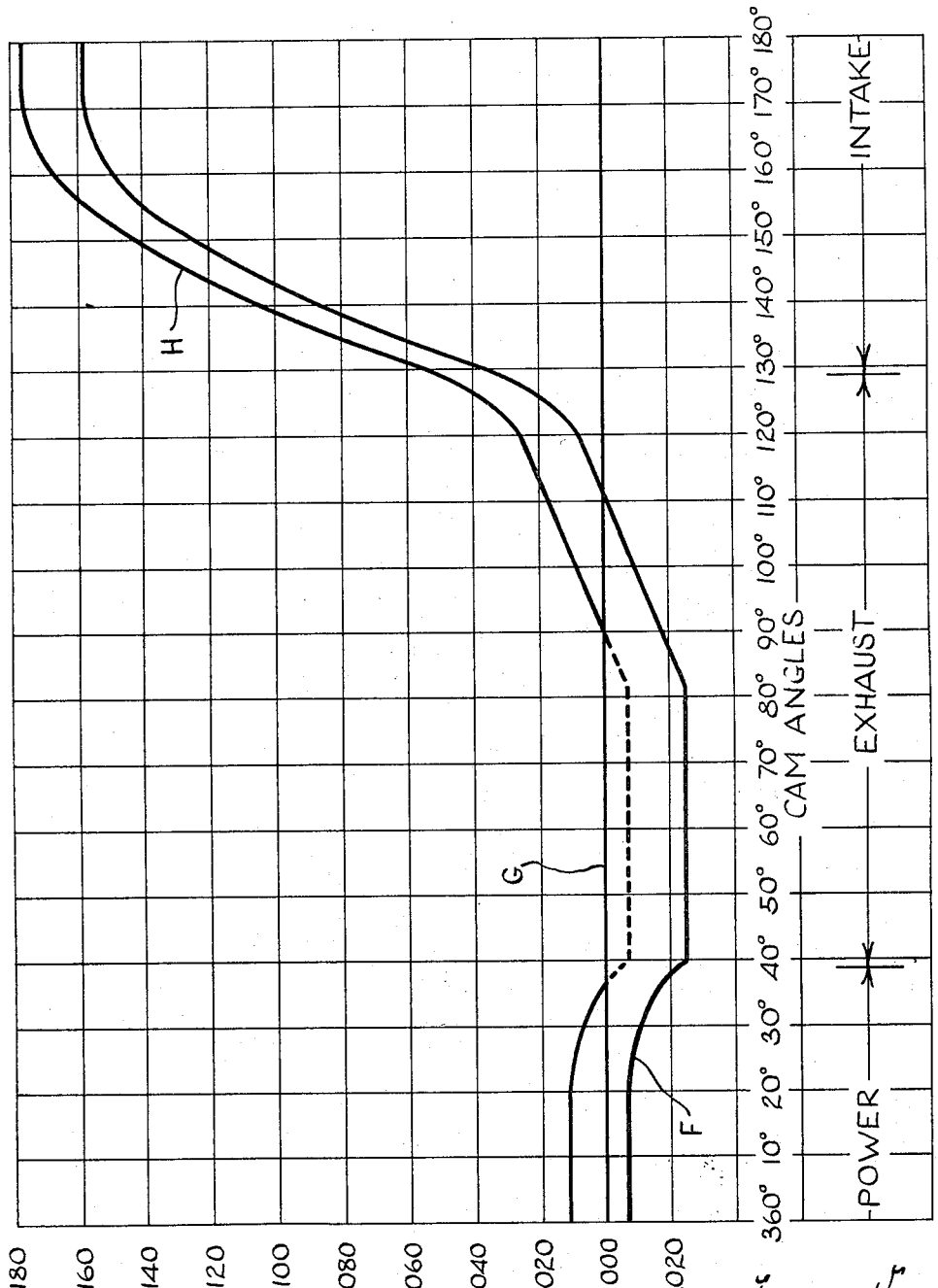

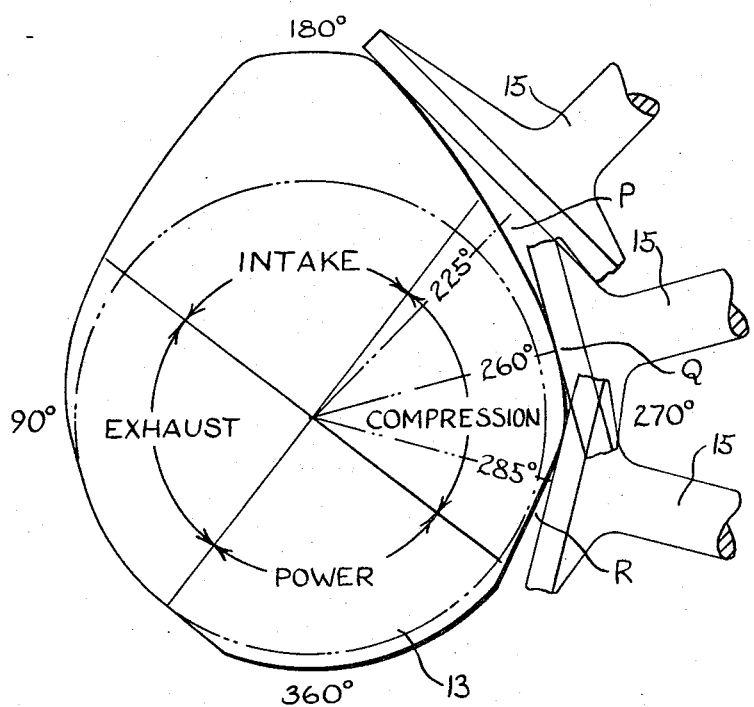

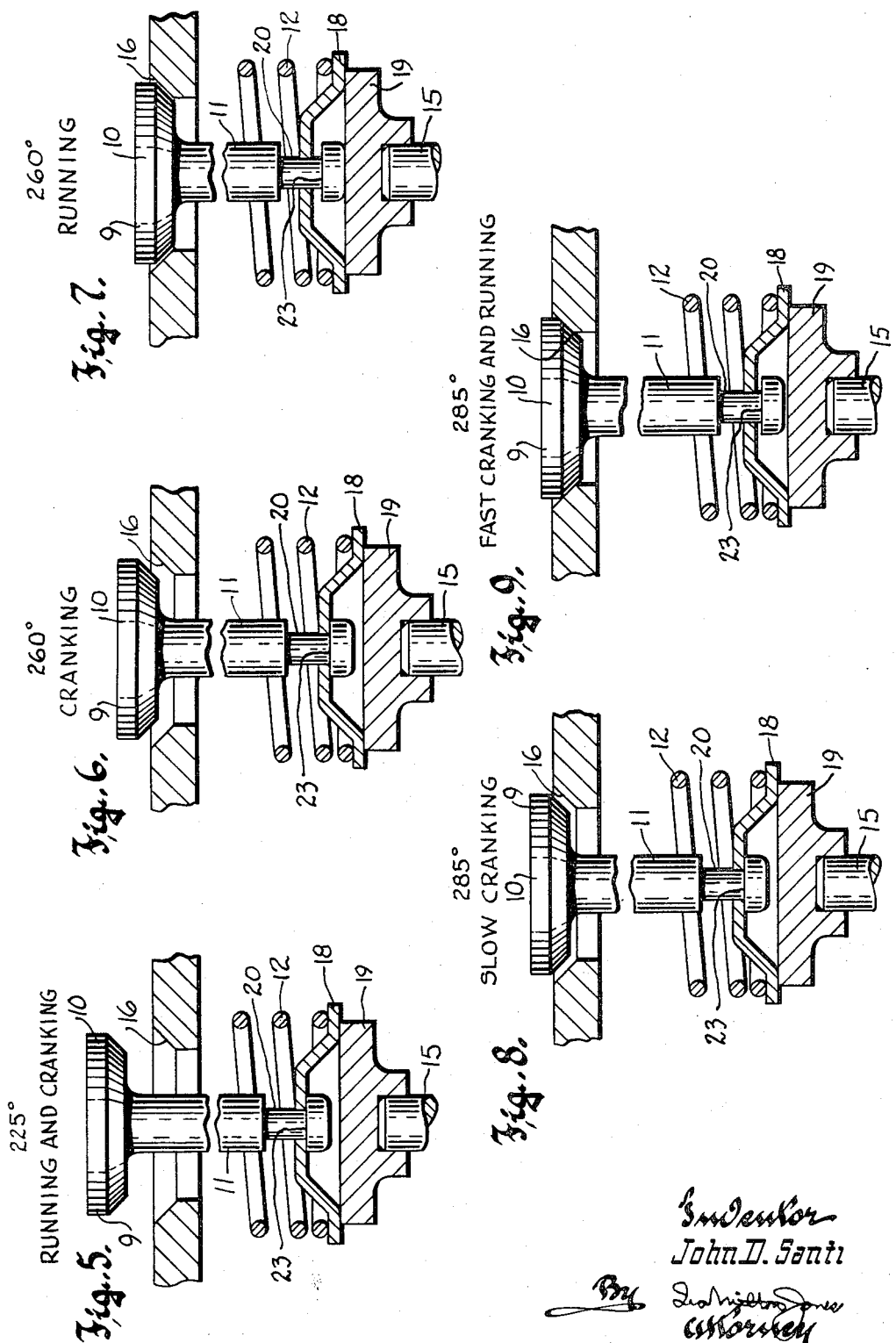

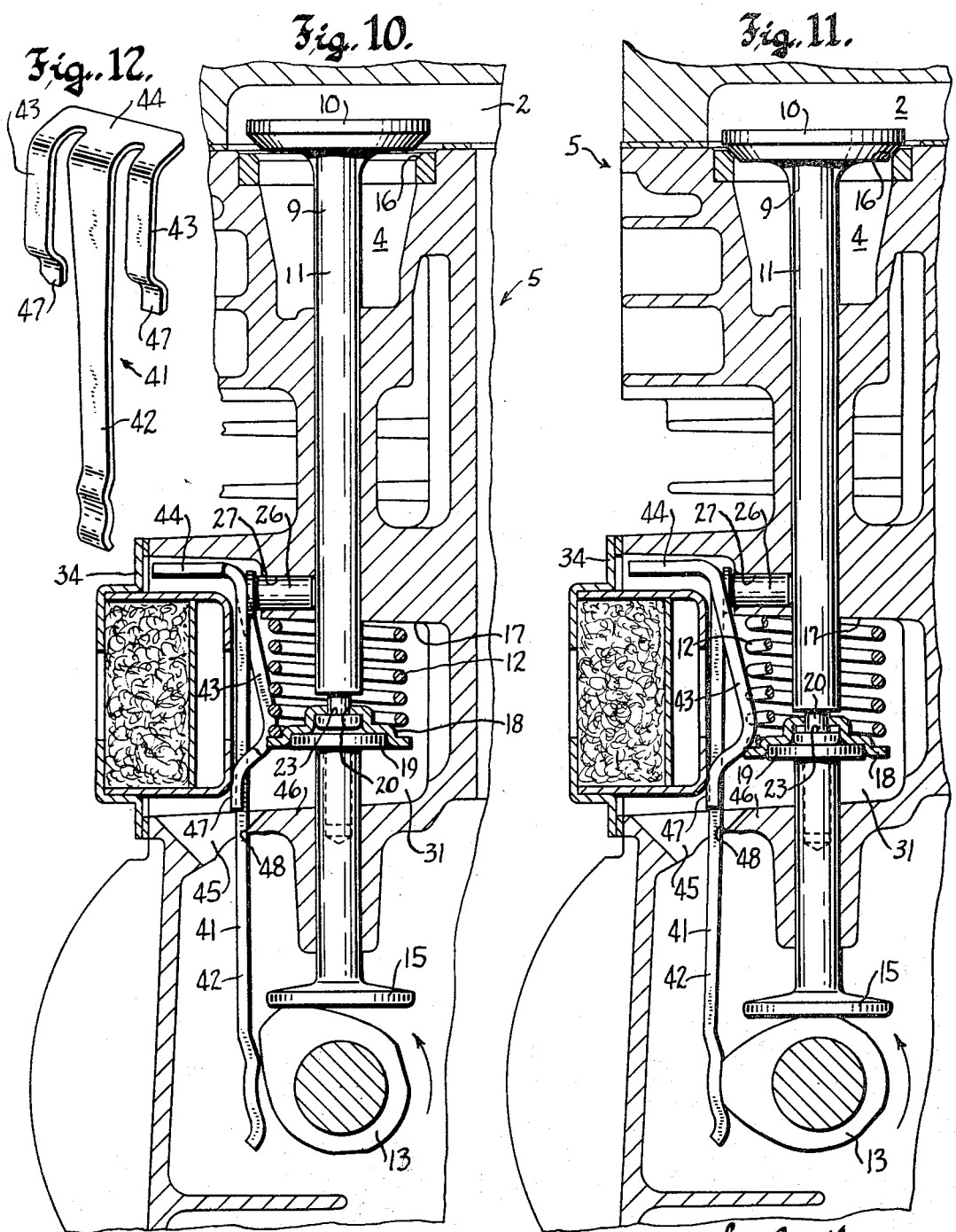

J. D. SANTI 3,403,667

COMPRESSION RELIEF FOR INTERNAL COMBUSTION ENGINES

Filed June 26, 1967

Inventor
John D. Santi

United States Patent Office 3,403,667
Patented Oct. 1, 1968

3,403,667
COMPRESSION RELIEF FOR INTERNAL
COMBUSTION ENGINES
John D. Santi, West Allis, Wis., assignor to Briggs &
Stratton Corporation, Milwaukee, Wis., a corporation
of Wisconsin
Continuation-in-part of application Ser. No. 607,257,
Jan. 4, 1967. This application June 26, 1967, Ser.
No. 648,721
31 Claims. (Cl. 123—182)

ABSTRACT OF THE DISCLOSURE

An orifice for relief of combustion chamber pressure during the compression stroke is controlled by a pressure responsive valve (which can be the intake valve) that tends to remain off its seat during the compression stroke but can be seated when the rate of escape of gas from the combustion chamber attains a critical value. Said critical value varies during the compression stroke, being substantially constant through the portion of the compression stroke in which the piston accelerates relative to the crankshaft and thereafter diminishing more rapidly than the piston decelerates relative to the crankshaft, so that escape of gas from the combustion chamber is controlled in such a manner that energy required for compression never exceeds kinetic energy available therefor. The valve is always seated before ignition occurs, but can be sucked off its seat during an unfired power stroke.

---

This application is a continuation-in-part of the applicant's allowed application, Ser. No. 607,257, filed Jan. 4, 1967.

This invention relates generally to a method and means for facilitating the starting of a reciprocating internal combustion engine by the automatic relief of compression in the engine while it is being cranked, without sacrifice of compression when the engine is running.

Probably no problem in the art relating to small reciprocating internal combustion engines has received as much attention in recent years as that of facilitating the starting of such engines.

Much of this effort has been directed toward the improvement of starting mechanisms, but the familiar rope starter is still the most popular cranking device, mainly because of its low cost.

More effective attempts to solve the starting problem have been directed toward the relief of compression in the combustion chamber during the compression stroke as the engine was being cranked. See for example Patent No. 2,999,491 to J. R. Harkness and the copending application of J. R. Harkness, R. W. Seilenbinder and J. D. Santi, Ser. No. 442,621 (now Patent No. 3,306,276).

The premise of prior compression relief expedients and of the present invention is that most of the work needed to crank an engine during starting is used to compress the charge of gas in the combustion chamber during the compression stroke of the piston, and that the work required for cranking can be reduced almost in direct proportion to the amount by which compression can be relieved. Hence if there can be achieved a very substantial relief of compression during cranking of the engine, as is attained with the present invention, the inexpensive rope starter becomes a fairly satisfactory starting mechanism, or, if the utmost ease and convenience is desired, the use of a very small and inexpensive electric self-starter becomes feasible.

Of course any expendient employed for compression relief should also enable substantially normal compression to be maintained when the engine is running, and it is extremely desirable—indeed, all but imperative—that any such expedient be automatic in accommodating itself to the different conditions obtaining in cranking and in running.

Generally, compression relief can be effected either by means of structure whereby the volume of the combustion chamber can be varied, so that it is enlarged during cranking and reduced to normal when the engine is running, or by providing for more or less controlled escape of gas from the combustion chamber as the piston is moving through its compression stroke during starting. Fundamental to this invention is a recognition that controlled escape of gas from the combustion chamber is by far the more practical alternative from the standpoint of efficiency, dependability, cost and mechanical simplicity.

It will be apparent at this point that the general object of this invention is to provide a very substantial reduction in the work required to start an internal combustion engine, and particularly the small, single-cylinder engines used for powering lawn mowers, snow blowers, sump pumps and the like; and that it is a more specific object of this invention to effect such reduction in starting effort by providing for controlled escape of gas from the combustion chamber when the piston is moving through the compression portion of its cycle as the engine is being cranked, while enabling the maintenance of substantially normal compression when the engine is running.

Another object of this invention is to provide a method and means for automatically reducing compression during starting in such a manner and to such an extent as to permit an engine to be started with less work, that is, with the exertion of less cranking torque during the time the engine is being started; to enable cranking torque to be applied more uniformly through the engine cycle so as to make manual starting of the engine more convenient; to greatly reduce or overcome the danger of kickback; and to make possible in many cases the use of a lighter flywheel than has heretofore been used on engines of equivalent horsepower and displacement, with resultant savings in cost and engine weight.

The present invention proceeds from a recognition that an engine can be started with a minimum of work and a maximum of convenience when it is provided with a compression relief arrangement which insures that the energy required for compression of gas during every compression stroke will be no greater than the kinetic energy of moving engine parts available at the beginning of that stroke; and it is another of the general objects of this invention to provide a method and means of providing compression relief in a manner to maintain an optimum relationship during every compression stroke between kinetic energy available and energy required.

In order to understand the nature and significance of the relationship just referred to, it is necessary to give some consideration to the role of the flywheel in engine starting, inasmuch as most of the kinetc energy available at the beginning of the compression stroke is that of the flywheel.

The following discussion has particular reference to single-cylinder four-cycle engines, but it will be apparent that the principles herein set forth are equally applicable to multi-cylinder four-cycle engines and, with some modifications which will be evident to those skilled in the art, to two-cycle engines.

When an engine is being cranked, the energy available for compressing the gas charge during the compression stroke is the kinetic energy of the flywheel (and of other moving engine parts), derived from work done in turning the crankshaft during other portions of the engine cycle, together with the energy available in the form of cranking torque that is applied to the crankshaft through the compression stroke. To the extent that the flywheel can store energy, it tends to reduce the cranking torque which must be applied during the compression stroke and thus makes for uniformity of cranking torque all through the engine cycle.

For practical purposes, the kinetic energy of a flywheel can be said to be directly proportional to its weight and to the square of its r.p.m. (Strictly, kinetic energy of a rotating mass is given by its moment of inertia multiplied by the square of its angular velocity.)

Because kinetic energy of the flywheel varies with the square of r.p.m., a relatively light flywheel is satisfactory for an engine that is running at its normal operating speeds. But a heretofore conventional engine having fixed ignition timing needed a flywheel substantially heavier than that required for satisfactory running, to insure against kickback during cranking. In an engine in which spark plug firing is always caused to occur at a predetermined point before the piston reaches top dead center in the compression stroke, the flywheel should have substantial momentum at the time the piston passes the ignition point, for otherwise the expanding combustion gases will exert such a great and rapidly increasing force upon the piston as to exceed the available torque forces, with the result that the piston is driven back down before it reaches top dead center, producing the reverse rotation of the crankshaft known as kickback.

In order to arrive at a reasonable compromise between prevention of kickball and the attainment of low overall engine weight and cost, it has heretofore been the usual practice to design a flywheel for a small engine mainly by the cut-and-try process, starting with a relatively heavy flywheel and progressively decreasing its mass until kickback occurred at normal starting speeds; then going back and selecting the smallest flywheel that would prevent kickball at the cranking speed assumed to be normal. This procedure produced an engine which would start satisfactorily under normal conditions but which was still likely to kick back in cold weather, when increased friction of the engine parts (due to greater viscosity of the oil) absorbed a larger portion of the available starting energy so that less kinetic energy was available to drive the piston through its compression stroke.

The flywheel that resulted from this cut-and-try procedure was of course substantially heavier than was needed for normal speed running, even if it was the lightest that could be used with respect to kickback during starting.

In an engine without provision for compression relief, the engine-flywheel combination thus obtained had the further very serious disadvantage of requiring a cranking torque during starting that varied greatly from one part of the engine cycle to another. Thus when a prior engine without provision for compression relief was equipped with a rope pull starter, a relatively light pull on the starting rope was sufficient during the exhaust and intake strokes; then during the compression stroke there would be a very heavy and rapidly increasing resistance to cranking; followed by an abrupt termination of resistance as the piston passed through top dead center and began moving downwardly in an unfired combustion stroke during which the compressed gas in the combustion chamber actually aided cranking to some extent.

For ideal starting conditions it is not only necessary that compression be relieved during cranking, but it is essential that it be relieved to such an extent and in such a manner that the energy required for compression of gas during each compression stroke bears a predetermined relationship to crankshaft r.p.m. at the beginning of that stroke. Specifically, for any crankshaft speed at the beginning of a compression stroke, the amount of energy required for compression of gas during that stroke must be low enough to permit the piston to be driven through and beyond top dead center solely by means of the kinetic energy of the moving engine parts, without reliance upon torque applied from an external source during the compression stroke. This can occur only when a maximum of compression relief is effected at the lowest cranking r.p.m.'s, and less and less compression relief is effected as r.p.m.'s increase. When this optimum situation exists, the cranking torque actually applied during the compression stroke is available to provide a margin of safety against kickback, and no greater torque need be exerted during the compression stroke than during the other portions of the engine cycle. In other words, if an engine fulfilling these optimum conditions is equipped with a rope starter, a substantially smooth, steady pull on the starting rope will be experienced all during the time the engine is being cranked. Equally important, when, at any r.p.m. above the very lowest cranking speeds, the piston is assuredly driven through top dead center solely by kinetic energy available at the beginning of the compression stroke, then the engine is capable of running at extremely low speeds, and therefore relatively little work need be done in cranking it to a speed at which it can run and accelerate under its own power.

Curve A in FIGURE 1 bears directly upon the relationship just explained, and it is therefore of the utmost importance to the problem of engine starting.

Curve A is computed for a typical single-cylinder four-cycle industrial engine (Briggs & Stratton Model 9) with its standard flywheel. For any given crankshaft r.p.m. at the beginning of a compression stroke, curve A shows the energy available for compression of gas during that stroke.

In computing curve A, only the kinetic energy of the flywheel was taken into account, and the kinetic energy of other moving engine parts was disregarded. This simplified calculations and insured conservative results. Further, in computing curve A it was assumed that the flywheel was decelerated during the compression stroke from the specified value of r.p.m. at the beginning of the stroke to 50 r.p.m. at the end of the stroke; that is, it was assumed that the flywheel (and crankshaft) would in every case be turning at 50 r.p.m. as the piston passed through top dead center at the end of the compression stroke. Finally, from the value for energy available from such deceleration of the flywheel there was subtracted the value of energy required to overcome engine friction at the mean r.p.m. value through the compression stroke. This gave a tabulation, which is plotted in curve A, of the energy available for compression of gas during the compression stroke and for driving the piston against combusting gas during the final portion of that stroke assuming ignition takes place.

To understand the significance of curve A with respect to the problem of compression relief, it must be borne in mind that optimum starting conditions cannot be obtained unless energy required to compress gas during the compression stroke is no greater than the kinetic energy available for that purpose during the compression stroke, as depicted by curve A. Further, it must be noted that the energy required to compress gas in the combustion chamber during the compression stroke is in part dependent upon the quantity of gas in the combustion chamber that must be compressed. Thus the energy required for compression can be reduced in a direct relationship to the quantity of gas that is permitted to escape from the combustion chamber during the compression stroke. However, the amount of energy required to compress the charge in the combustion chamber also has a direct relationship to the distance through which the piston travels during the time that compression is taking place. Hence the energy required for compression is dependent not only upon the amount of gas that is permitted to escape from the combustion chamber for purposes of compression relief, but also upon the point in the compression stroke at which such escape of gas is terminated.

For a full appreciation of the nature and significance of the present invention, curve A, which represents energy available, should be compared with curves of energy actually required for gas compression through a compression stroke at each r.p.m. for the same engine-flywheel combination with no provision for compression relief, and when equipped with a prior compression relief arrangement. Such curves are also given in FIGURE 1.

Curve B in FIGURE 1 depicts energy required through a compression stroke, plotted against r.p.m. at the beginning of that stroke, for the engine-flywheel combination for which curve A is computed, but with no provision for compression relief. It will be noted that curve B lies well above curve A through the range of r.p.m.'s in which cranking normally occurs, and that an engine having the characteristics represented by curve B cannot run unless its flywheel is turning at least about 850 r.p.m. at the beginning of each compression stroke, as indicated by the fact that curves A and B intersect at that r.p.m. value. Minimum running speed is closely related to the speed to which an engine must be cranked if starting is to take place without danger of kickback, inasmuch as cranking torque actually available during the compresison stroke is always limited.

If the engine represented by curve B were provided with a more massive flywheel, its curve of energy available vs. r.p.m. would have the same shape as curve A but would be swung to the left about the point of origin, inasmuch as the heavier flywheel would have more kinetic energy at any given r.p.m. Curve A' represents these conditions, and is a plot of energy available vs. r.p.m. for the same engine for which curve A is computed, but with a flywheel having a moment of inertia about three times that of the curve A engine.

It is evident that with a heavier flywheel the engine could run at lower minimum speeds, would offer less danger of kickback, and would take a more nearly constant cranking torque through its cycle. But curve A' represents a flywheel that is inordinately heavy and expensive. It would be a practical impossibility to use a flywheel heavy enough to bring the curve of energy available vs. r.p.m. completely above curve B, the curve for energy required vs. r.p.m.

It is clear, therefore, that the only feasible way to bring the curve of energy required vs. r.p.m. down to or below the curve corresponding to curve A for a particular engine is to substantially reduce the quantity of gas to be compressed, at r.p.m.'s in the cranking range, by means of an expedient that provides for compression relief.

Heretofore the nearest approach to an automatic compression relief expedient that satisfied the conditions exemplified by curve A in FIGURE 1 was that of Harkness Patent No. 2,999,491. In the compression relief arrangement of the Harkness patent, one of the valve cams (preferably that which controlled actuation of the intake valve) held its valve off of its seat by about .010 in. during movement of the piston through a substantial portion of its compression stroke, said valve being thus open while the piston moved from a point about one-eighth of its ascent from bottom dead center to about the point at which the piston had maximum velocity relative to the crankshaft, with gradual closure of the valve occurring after the piston passed the last mentioned point, until the valve was completely closed as the piston passed a point about three-quarters of the way through its compression stroke. With this arrangement the slightly open valve provided a precisely controlled orifice through which part of the charge being compressed escaped from the combustion chamber, to thus significantly reduce compression during starting, when the piston travelled slowly. At running speeds, however, the orifice provided by the partly open valve permitted only an insignificant amount of gas to escape and did not detrimentally affect engine performance to any appreciable extent.

Curve C in FIGURE 1 depicts energy required for compression of gas during the compression stroke vs. r.p.m. for the same engine covered by curves A and B, but incorporating the compression relief arrangement of the Harkness patent. It will be seen that at cranking r.p.m.'s the energy required for compression of gas in such an engine was above the values of available kinetic energy as represented by curve A, but was substantially below that for the same engine without compression relief. Such an engine could therefore be started with substantially less work than one which did not have compression relief, and was less likely to kick back. Furthermore, as indicated by the intersection of curves A and C in FIGURE 1, the minimum idling speed of such an engine was somewhat below that of an equivalent engine-flywheel combination without compression relief, further reducing the amount of work required to crank it. However, there was still a substantial amount of irregularity in the torque required (rope starter pull) through the engine cycle, especially since there was no provision for relief of suction during an unfired power stroke.

The expedient of the Harkness patent represented a very substantial advance in the art with respect to facilitating the starting of small engines, and met with outstanding commercial success. However, it is a general object of the present invention to advance substantially beyond that improvement and make possible even greater starting ease; and more specifically to further reduce to a very substantial extent the amount of work required to start an engine, and to make possible the accomplishment of such work with a substantially constant cranking torque all through the engine cycle.

Another specific object of the present invention is to provide a compression relief arrangement for an engine such that at every r.p.m. above the very lowest cranking speeds the energy required for compression of gas through the compression stroke is less than the flywheel kinetic energy that is available for compression of gas during that stroke, without, however, requiring that the flywheel be heavier than one heretofore conventional for an engine of equivalent horsepower and displacement.

In connection with the last stated object of the invention it might be noted that it will usually not be feasible to insure that the curve of energy required vs. r.p.m. will be at or below the computed curve of energy available vs. r.p.m. at the very lowest cranking speeds (below about 150 r.p.m.), owing to the fact that available kinetic energy varies with the square of rotational speed. But this low end of the cranking speed range is not significant with respect to the problem of starting the engine of this invention because of the low torque required to bring the engine through it.

A further specific object of this invention is to provide a compression relief arrangement for an internal combustion engine that effects relief of suction during an unfired power stroke. The practical importance of effecting such suction relief is explained in the aforesaid copending application Ser. No. 442,621 (now Patent No. 3,306,276) but it might be here noted that provision for suction relief further contributes to a very substantial extent to light and uniform resistance to cranking all through the engine cycle.

Another object of this invention is to provide an engine with magneto ignition that can begin to run at extremely low crankshaft speeds (on the order of 150 to 200 r.p.m.), so that little work is required for cranking the engine to bring it up to running speed.

It is also an object of this invention to provide a compression relief arrangement which makes possible, at least on larger engines, the use of a lighter flywheel than has heretofore been required on an engine of comparable horsepower and displacement, and which makes possible the selection of an adequate flywheel on the basis of computations rather than on the basis of the cut-and-try procedure heretofore used.

How well the present invention achieves these objectives can be judged from curve D in FIGURE 1, which is a plot of energy required vs. r.p.m. for the engine-flywheel combination of curves A and B but incorporating the compression relief expedient of the present invention. Note that at all values higher than about 200 r.p.m. curve D lies well below curve A. The practical significance of this relationship is that an engine-flywheel combination corresponding to the Briggs & Stratton Model 9, but embodying a compression relief arrangement according to the principles of the present invention, can be started with about one-fourth peak rope starter pull force required for starting a counterpart engine without compression relief, and with scarcely any variation in pull detectable through the engine cycle; and with proper fuel-air mixture adjustment it can idle fairly smoothly at substantially less than 500 r.p.m.

In general, the invention resides in the provision of a method and means for so relieving compression in the combustion chamber of an engine while it is being cranked as to provide for an increasing pressure in the combustion chamber all through the compression stroke, and to provide for higher peak pressures at higher cranking r.p.m.'s, the increase in peak pressure with increasing r.p.m.'s being such that the energy required for compression of gas during each compression stroke is no greater than the kinetic energy available for gas compression at the beginning of that stroke.

More specifically the invention contemplates the provision of an orifice through which gas can escape from the combustion chamber during the compression stroke at a controlled rate such that pressure in the combustion chamber continually increases all through the compression stroke, and the closure of said orifice whenever the rate of escape of gas from the combustion chamber attains a predetermined relationship to the instantaneous rate at which pressure in the combustion chamber is increasing, the orifice being in every instance closed before the piston reaches the end of its compression stroke and never later than the instant at which ignition is intended to occur. Such closure of the orifice can be effected by means of a valve that is responsive to the rate at which gas escapes from the combustion chamber through said orifice and which moves toward a closed position when such rate of gas escape reaches a critical value, said critical value being one that changes during the compression stroke. Through the compression stroke the critical value of rate of gas escape at which valve closure is effected decreases continually relative to the ratio of piston velocity to crankshaft velocity; that is, said critical value can be substantially constant during that portion of the compression stroke in which the piston accelerates relative to the crankshaft, and during the remainder of the compression stroke said critical value must decrease more rapidly than the piston decelerates relative to the crankshaft.

Two arrangements can be used alternatively or in combination to achieve the necessary decreasing relationship between critical value of rate of escape of gas from the combustion chamber at which valve closure is effected and the ratio of piston velocity to crankshaft velocity. In one of these arrangements, motion of the valve towards its seat is yieldingly opposed with a force which is uniform all through that portion of the compression stroke in which the valve is intended to be responsive to rate of gas escape, and the valve gap or spacing of the valve from its seat is appropriately varied during the time the valve is open. In the other, the valve is maintained a uniform distance from its seat during the time that it is open, and a yielding force which opposes its closing motion is appropriately varied through the compression stroke.

With the first mentioned arrangement, the valve, when open, is maintained a uniform small distance from its seat during that portion of the compression stroke in which the piston is accelerating relative to the crankshaft, and is then moved towards its seat as the piston decelerates relative to the crankshaft, the rate of diminution of the valve gap being faster than the rate of deceleration of the piston. Thus during piston acceleration relative to the crankshaft, when combustion chamber pressure is increasing at an accelerating rate, the rate of gas escape from the combustion chamber required to effect closure of the valve remains constant; and during piston deceleration, when the rate of increase of combustion chamber pressure is decreasing, the rate of gas escape required to effect closure of the valve is decreasing more rapidly.

With the other arrangement, both valve gap and the force yieldingly opposing closing motion of the valve are again maintained constant during that portion of the compression stroke in which the piston is accelerating relative to the crankshaft, but said yielding force is diminished during that part of the compression stroke in which the piston decelerates relative to the crankshaft, and is diminished at a rate higher than the rate of piston deceleration.

With either of these arrangements (or with a suitable combination of both), the time of valve closure is always a function of engine r.p.m. during the compression stroke, and the critical rate of gas escape for valve closure is attained earlier with increasing r.p.ms. As a result, the peak combustion chamber pressure developed during the compression stroke will always be dependent upon crankshaft r.p.m. and will be such that the energy required to compress gas to that peak pressure is no greater than the kinetic energy available for such compression.

With the above and other objects in view which will appear as the description proceeds, this invention resides in the novel method and in the novel construction, combination and arrangement of parts substantially as hereinafter described and more particularly defined by the appended claims, it being understood that such changes in the precise embodiments of the herein disclosed invention may be made as come within the scope of the claims.

The accompanying drawings illustrate several complete examples of physical embodiments of the invention constructed according to the best modes so far devised for the practical application of the principles thereof, and in which:

FIGURE 1 is the above discussed plot of energy available for compression of gas vs. r.p.m., in relation to plots of energy required vs. r.p.m., for corresponding prior art engines and for engines embodying the present invention;

FIGURE 2 is a fragmentary vertical sectional view through a single-cylinder four-cycle engine incorporating the present invention, shown under the conditions that exist during running of the engine just before the piston reaches the point in its compression stroke at which its velocity is maximum relative to the speed of the crankshaft;

Figure 13:
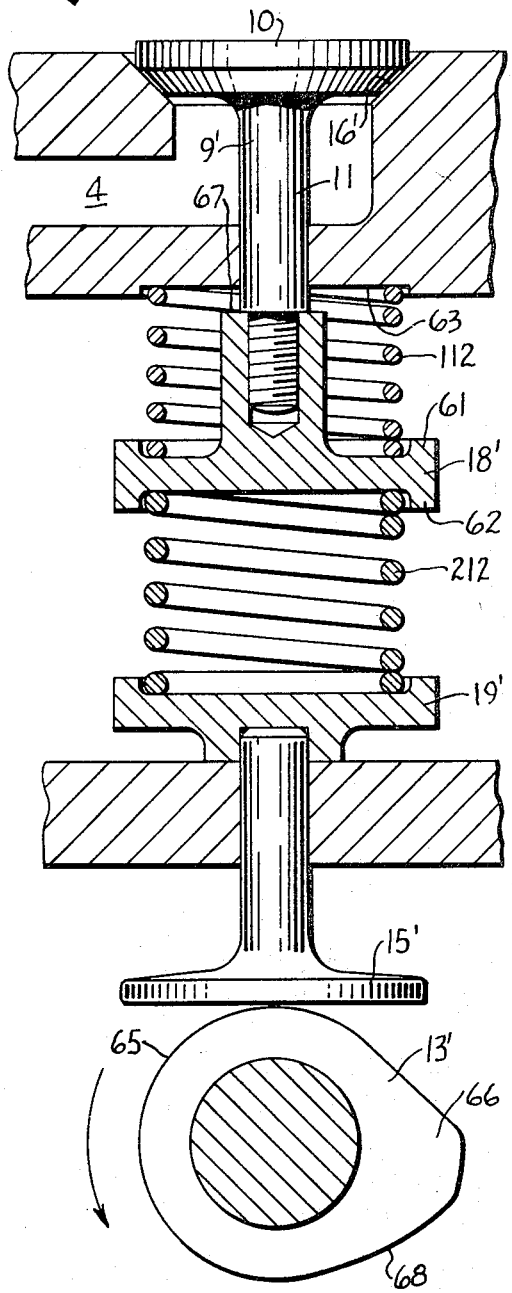
Figure 14:
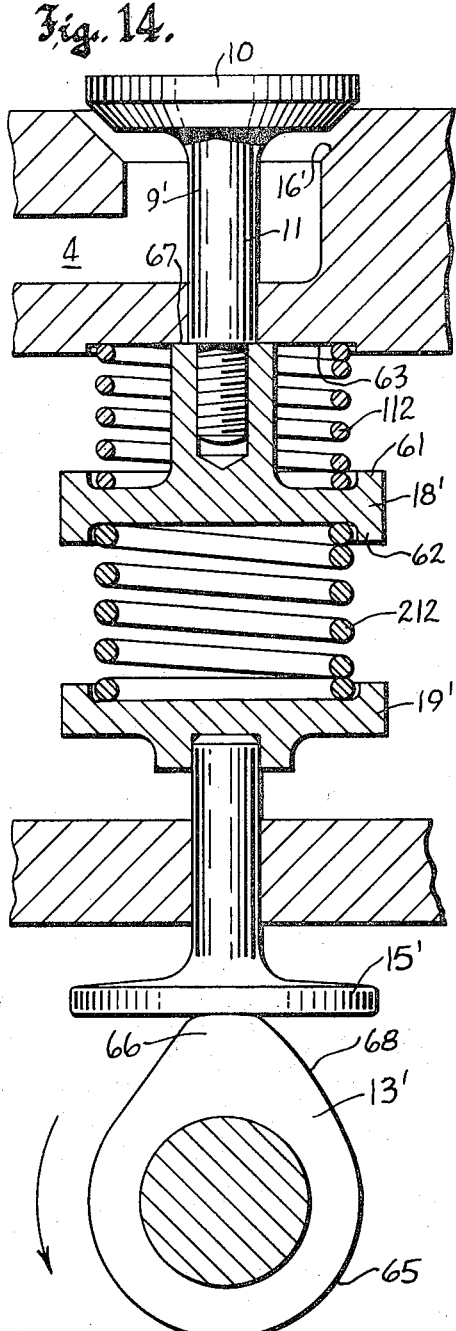

FIGURES 3a and 3b together constitute a cam lift diagram for a valve actuating mechanism embodying the compression relief arrangement of this invention, together with a corresponding plot of the positions the valve can occupy with respect to its seat at the upper limit of its free travel;

FIGURE 4 is a greatly enlarged view of a cam for a valve actuating mechanism embodying the principles of this invention;

FIGURES 5–9 inclusive are diagrammatic views of the valve and its actuating mechanism under various conditions;

FIGURE 10 is a fragmentary sectional view through an engine incorporating another embodiment of the present invention, and particularly showing the intake valve and its actuating mechanism under conditions that obtain in the initial part of a compression stroke, at about the point at which the intake valve will have just closed in a heretofore conventional engine;

FIGURE 11 is a view similar to FIGURE 10, but showing conditions about midway through the compression stroke with the engine running under its own power;

FIGURE 12 is a perspective view of the leaf spring member in the embodiment of the invention illustrated in FIGURES 10 and 11;

FIGURE 13 is a fragmentary view of a valve and its actuating mechanism comprising still another embodiment of the invention, illustrated under conditions that obtain just prior to the beginning of the compression stroke; and FIGURE 14 is a view generally similar to FIGURE 13 but illustrating conditions that exist about one-third of the way through a compression stroke.

Referring now more particularly to the accompanying drawings, the numeral 5 designates generally the cylinder of a four-stroke cycle engine in which a piston 6 is reciprocable to drive a crankshaft 7 through a connecting rod 8. The upper portion of the enclosure which comprises the cylinder constitutes a combustion chamber 2 into which projects a spark plug 3 for igniting combustible gases therein.

As the piston moves through each stroke, it first accelerates and then decelerates relative to the crankshaft. The connection between the piston and the crankshaft is such that during the compression stroke the piston has its maximum velocity relative to the crankshaft when it is about five-eights of the way through that stroke.

The engine is provided, as is conventional, with an inlet poppet valve 9 which controls the admittance of fuel-air mixture to the combustion chamber from an intake manifold 4. It will be understood that the engine also has an exhaust poppet valve (not shown) which controls discharge of combusted gases from the combustion chamber. While the invention is herein described and illustrated as applied to the inlet valve, it will be evident that with slight modification it could be applied to the exhaust valve, or even to a valve separate from those used for normal respiration of the engine.

The valve 9 is illustrated as having its head 10 uppermost and its stem 11 projecting downwardly therefrom, but as the description proceeds it will become apparent that the orientation of the valve is not critical.

The valve 9 is generally controlled by actuating mechanism comprising a spring 12 and a cam 13 that is rotated at one-half crankshaft speed by means of timing gears 14 which drivingly connect the cam and the crankshaft. However in this case there is a lost motion connection (described hereinafter) between the valve and its actuating mechanism, whereby the valve is permitted to have a predetermined small amount of motion relative to the actuating mechanism.

The cam 13 acts through a tappet 15 in driving the valve in its opening direction, i.e., upwardly away from its seat 16. The spring 12, which normally biases the valve downwardly towards its seat and which tends to maintain following relationship between the tappet and the cam, reacts between a fixed spring seat 17 on the engine body and a hat-shaped spring retainer 18 that can rest on a suitable head 19 fixed on the upper end of the tappet. Near its lower end the valve stem has a narrow neck portion 20 that freely slidably passes through a coaxial hole in the spring retainer 18 and which defines an upwardly facing shoulder 23 near the bottom of the valve stem. The distance from the shoulder 23 to the bottom 22 of the valve stem is less by a predetermined amount than the distance from the top surface 21 of the tappet head to the underside of the crown of the hat-shaped spring retainer 18, to provide for limited free travel of the valve relative to its actuating mechanism. The lower limit of such free travel is of course defined by engagement of the bottom surface 22 of the valve stem with the top surface 21 on the tappet head, and the upper limit of such free travel is defined by engagement of the shoulder 23 against the underside of the spring retainer 18. Preferably the distance through which the valve can have such free travel is on the order of .010 to .020 in.

However, free motion of the valve 9 relative to its actuating mechansm is yieldingly opposed, preferably by friction means which at all times bears against a portion of the valve stem that is axially intermediate the head 10 and the narrow neck 20. The friction means can comprise a rubbing block or friction pad 26 of a friction material such as that from which automotive brake bands and clutch facings are made, arranged to slide toward and from the valve stem in a closely fitting cavity 27 in the engine body, a compression spring 28, and spring seat means 29 fixed on the engine body for receiving the reaction of the compression spring 28. As shown, the friction means is accommodated in that portion 30 of the engine body which comprises the valve guide, directly above the chamber 31 in which the valve springs 12 are housed, where the friction means does not interfere with the valve actuating mechanism. The spring seat means 29 can comprise a portion of a removable cover plate 34 for the valve spring chamber 31.

The compression spring 28, which is confined between the spring seat means 29 and the friction pad 26, maintains the friction pad engaged with the valve stem under bias. In the embodiment of the invention illustrated in FIGURE 2, the portion of the valve stem engaged by the friction pad 26 has a small upwardly convergent taper, as at 35, so that upward motion of the valve is resisted somewhat more effectively than downward movement thereof, for reasons explained hereinafter. Normally the biasing force on the rubbing block is of such value that the friction means resists downward motion of the valve at pressure differentials across its head of up to about 1 p.s.i., and resists upward motion in response to pressure differentials across its head of up to about 4 p.s.i. These values are not critical, however, but are merely illustrative of a preferred range. Normally the orientation of the valve is likewise not critical because the force imposed upon the valve head by a pressure differential of even as low as 1 p.s.i. is very substantially greater than the weight of the valve.

The configuration of the cam 13 is of great importance, inasmuch as it makes possible the controlled escape of gas from the combustion chamber which is of the essence of the present invention. The actual shape of the cam is represented by FIGURE 4, while FIGURE 3a–3b is a projected cam lift diagram which shows the position or positions that the valve can occupy at any given position of the cam. More specifically, the lower curve (designated F) in FIGURE 3a–3b is a projection of the cam profile in relation to the valve seat, which is designated by a horizontal line G, while the upper curve (designated H) represents the upper limit of free travel of the valve at every angular position of the cam. In this instance the valve is shown as having .018 in. of free travel relative to its actuating mechanism, in that curves F and H are at every angular position of the cam represented as being .018 in. apart.

It should be observed that FIGURE 3a–3b is plotted in terms of cam angle, i.e., the relative angular position of the cam 13, and it should of course be kept in mind that the crankshaft rotates at twice the speed of the cam, making two revolutions (a complete engine cycle) for each revolution of the cam. The zero cam angle position is arbitrarily taken at about the midpoint of the power stroke.

Tracing operation of the actuating mechanism for the intake valve 9 from the left hand side of FIGURE 3a–3b, it will be seen that the cam, as is conventional, has maximum lift when the piston is in the mid-portion of its intake stroke, that is, the cam then holds the valve at the greatest distance away from its seat.

Through the final portion of the intake stroke and the initial portion of the compression stroke, a "downhill" portion of the cam is engaged with the tappet, as diagrammatically illustrated at P in FIGURE 4, and the actuating mechanism moves the valve rather rapidly towards its seat. Through this portion of the cycle, however, pressure in the combustion chamber is no higher than pressure in the intake manifold, and during cranking and when the engine is running slower than its normal idling speed the friction means is therefore effective to hold the valve at the upper limit of its free travel relative to the actuating mechanism, i.e., with the shoulder 23 on the valve stem engaging the spring retainer 18. This condition is illustrated in FIGURE 5. Hence through this valve closing portion of the cycle the instantaneous positions of the valve relative to its seat will be as represented by the upper line, curve 14, in FIGURE 3a–3b.

For a time after the piston comes into the portion of its compression stroke at which intake valve closure has heretofore conventionally occurred, the portion of the cam then engaged with the tappet has a constant effective radius such that the valve is held about .004 in. off of its seat even if the valve is at the lower limit of its free travel. This constant effective radius portion of the cam, which is designated by Q in FIGURE 4, is represented by the part of curve F that lies between about the 245° cam angle and the 275° cam angle, and it is to be observed that it prevents full seating of the valve until the piston attains its maximum velocity relative to the crankshaft. If the valve is at the upper limit of its free travel in this part of the cycle, it will of course be spaced an additional .018 in. above its seat. The numerical values here given are of course those represented by FIGURES 3a–3b and are to be understood as illustrative.

From the point of maximum piston velocity at about the 275° cam angle, to a point at about the 297° cam angle, shortly before ignition is intended to occur, a diminishing radius portion of the cam, indicated at R in FIGURE 4, is engaged with the tappet, as represented by the "downhill" portion of curve F between these points. If the valve is at the lower limit of its free travel relative to the actuating mechanism, it will be brought into engagement with its seat very early in the "downhill" portion of the cam, and specifically at 281 cam degrees as represented by the fact that curve F crosses the horizontal line G, representing the valve seat, at the 281° point. If the valve should remain at the upper limit of its travel all through this portion of the compression stroke (as would happen only during very slow cranking) it will nevertheless be brought onto its seat when the cam attains its 297° position, as indicated by the fact that curve H touches valve seat line G at the 297° point.

Through the power stroke, as indicated by the relationships of curves F and H to valve seat line G, the valve will be on its seat if it is at the lower limit of its free travel and will be .012 in. above its seat if it is at the upper limit of its free travel. The actual position of the valve during the power stroke depends upon whether or not combustion has occurred near the conclusion of the immediately preceding compression stroke. If it has, pressure in the combustion chamber will of course maintain the valve firmly seated. If no combustion has occurred, there will be a relative vacuum in the combustion chamber as the piston descends in the unfired power stroke, owing to the permitted escape of gas during the preceding compression stroke, and the valve will be literally sucked open to relieve the vacuum as the piston descends, with the result that cranking is greatly facilitated. It will be seen that such provision for suction relief during an unfired power stroke is in accordance with the teachings of the above mentioned copending application Ser. No. 442,621, now Patent No. 3,306,276.

Through its exhaust stroke portion the cam is cut down below its base circle, that is, its radius is small enough so that the valve is maintained seated by the spring 12 of its actuating mechanism and the tappet can have a play of about .006 in. between the cam and the underside of the spring retainer 18, as represented by the fact that curve H is below valve seat line G in this portion of the cycle.

Finally, the cam has a pronounced lobe or rise which lifts the valve off of its seat just before the end of the exhaust stroke and raises it to its fully open position during the first portion of the intake stroke so that a fresh charge of combustion gas can be admitted to the combustion chamber in the usual manner.

Returning now to a consideration of what takes place during the compression stroke, it will be recalled that the friction means tends to hold the valve at the upper limit of its free travel as the valve is brought toward its seat from its fully open position, as illustrated in FIGURE 5. During cranking and very slow running of the engine, the valve thereafter tends to be moved towards its seat, down to the lower limit of its free travel range, in response to rate of flow of gas across its head, that is, the rate at which gas escapes from the combustion chamber through the valve seat.

The value of gas flow rate across its head at which the valve will actually move towards its seat varies during the compression stroke. Through that portion of the compression stroke in which the piston is accelerating relative to the crankshaft (i.e., until about the 270° cam angle), this critical value remains constant, at about 1 p.s.i., owing to the fact that both the valve gap (distance between the valve head and the seat) and the friction force on the valve remain constant. From the 270° cam angle to the 297° cam angle, when the piston is decelerating relative to the crankshaft, the valve gap is steadily decreasing the value of the critical gas flow rate across the valve head decreases correspondingly, that is, the valve can be moved towards its seat in response to lower and lower rates of gas flow across its head. Note that in this part of the compression stroke the valve gap decreases faster than the piston decelerates.

Because, all through the compression stroke, the critical value of rate of gas escape for valve closure is decreasing relative to the instantaneous rate at which combustion chamber pressure is increasing, the valve closes earlier when pressure builds faster; that is, the valve closes earlier at higher values of engine r.p.m.

If the engine is being cranked fairly slowly, pressure will be relieved through the orifice provided by the partly open valve 9 almost as fast as it is built up by the movement of the piston through its compression stroke, and since the rate of gas escape is a function of gas pressure in the combustion chamber, the critical value of gas escape rate for effecting motion of the valve toward its seat will be reached quite late in the compression stroke. During such slow cranking and prior to attainment of the critical escape rate value, the relationship of the valve to its seat and to its actuating mechanism will be as shown in FIGURES 6 and 8, which respectively illustrate conditions just before and just after the point in the compression stroke at which the piston has its maximum velocity relative to the crankshaft, corresponding to points Q and R in FIGURE 4.

If the engine is being cranked fairly rapidly, the rate of pressure rise in the combustion chamber is more rapid, since relatively less leakage out of the compression relief orifice can occur during a given increment of piston motion, and the critical value of rate of gas escape for motion of the valve towards its seat is reached earlier in the compression stroke.

Note that in the FIGURE 2 embodiment of the invention full seating of the valve is not permitted during the initial portion of the compression stroke even at normal running speeds, but that the valve is instead held off its seat by a very small distance, in this case .004 in. This condition is shown in FIGURE 7, which illustrates the same instant in the compression stroke as FIGURE 6 but under conditions when the critical escape rate value is reached very near the beginning of the compression stroke. The reason for holding the valve slightly off its seat as just described is that when the engine is operating at its higher running speeds the valve acquires substantial downward momentum during spring propelled movement toward its seat at the beginning of the compression stroke. Because of its lost motion connection with its actuating mechanism, this momentum carries it through its free travel range as the actuating mechanism rapidly decelerates, and if allowed to engage its seat at this time it would do so with such force as to cause undue wear. It will be seen that the valve has no tendency to bounce on the tappet because its upward motion relative to the tappet is more effectively inhibited than its downward motion relative thereto, owing to the provision of the taper 35 in the portion of the valve stem engaged by the friction pad 26.

During cranking the friction mechanism is of course effective to resist the downward momentum of the valve and to maintain it at the upper limit of its free travel until it is forced down by pressure differential across its head due to gas escaping at a rate which is of the above mentioned critical value.

During normal running the valve remains at the .004 in. spacing above its seat through a period of dwell (see FIGURE 7) between cam angles of about 245° and 275°. This period of dwell terminates at the point at which the piston reaches its maximum velocity relative to the crankshaft. The valve is then eased down onto its seat during the course of a further six or seven degrees of cam rotation. The very small orifice afforded by the unseated valve during this period of dwell does not permit any significant amount of gas to escape from the combustion chamber, so that the valve can then be considered to be substantially closed. Hence an engine embodying the principles of this invention can have a horsepower output equivalent to that of an engine of the same displacement and compression ratio without provision for compression relief.

At slow cranking speeds the valve is at the upper limit of its free travel during the period of dwell just mentioned (see FIGURE 6), to provide an orifice which affords a substantial amount of compression relief, the valve being then spaced about .022 in. from its seat. The amount of compression relief thus afforded is suggested by a comparison with the engine of the above mentioned Harkness patent, wherein the valve was open only about .010 in. during the period in which it provided for compression relief.

Assuming slow cranking continued after the piston began to decelerate relative to the crankshaft during the compression stroke, pressure would decrease in the combustion chamber if the area of the compression relief orifice remained constant at a fairly large value, inasmuch as the decelerating piston would build up pressure more slowly than such orifice permitted it to be relieved. To prevent this, and to insure that peak pressure always occurs at the conclusion of the compression stroke, the actuating mechanism moves the valve toward and onto its seat at a slightly faster rate than the piston decelerates, as will be evident from a consideration of curve H between cam angles of about 275° and 297°. Through this portion of the compression stroke, therefore, pressure in the combustion chamber continues to rise, even during very slow cranking. Besides insuring that pressure in the combustion chamber rises all through the compression stroke, such decrease in the valve gap between cam angles of 275° and 297° has the effect of steadily decreasing the critical value of rate of gas escape at which the valve is actuatable towards its seat in response to gas pressure in the combustion chamber. As the valve gap decreases, less and less energy is required to move the valve through its free travel range, and therefore it can close in response to smaller and smaller pressure differentials across its head, or, in other words, to lower and lower rates of gas escape.

Once seated, the valve is of course maintained seated under the influence of pressure gas in the combustion chamber, although, as brought out above, it can be sucked off its seat during an unfired combustion stroke if pressure in the combustion chamber falls to a value about 4 p.s.i. below that in the intake manifold.

During cranking of a magneto ignition engine its magneto cannot produce as high a voltage as during running. However the voltage required for spark plug firing varies with the pressure of gas in the combustion chamber, and since peak pressures are very low during cranking in an engine embodying the present invention, the relatively low voltage output of the magneto is nevertheless adequate for ignition. This means, in turn, that the engine can begin running under its own power at a very low speed, so that little work is required to crank it to a speed at which it begins to run. Of course the engine is capable of such low speed running by reason of the optimum relationship between energy required and r.p.m. made possible by this invention, which insures that the piston will always be driven through its compression stroke by kinetic energy of the flywheel.

It will now be apparent that the slope of the curve of energy required vs. r.p.m. can be controlled in an engine incorporating the present invention by the configuration of the cam for the valve that provides for compression relief, by the amount of free travel that the valve is permitted to have relative to its actuating mechanism and by the amount of friction with which free travel of the valve is yieldingly opposed. If the valve is held farther off its seat during the early part of the compression stroke, peak compression pressures will be lower; whereas if it is maintained closer to its seat, the curve of energy required vs. r.p.m. will have a steeper slope. If friction on the valve is changed in a manner to increase resistance to its downward motion all through the compression stroke, as by decreasing the taper 35 on the valve stem or increasing the strength of spring 28, peak compression stroke pressures will be lower and the curve of energy required vs. r.p.m. will have a more gradual slope.

With these relationships in mind, a desired slope of the curve of energy required vs. r.p.m. can be selected by suitable arrangement of the valve mechanism, and on the basis of that curve an appropriate flywheel for the engine can be designed by calculations which will be well within the skill of those versed in the art. Alternatively, it is relatively simple to incorporate the present compression relief arrangement in an existing engine-flywheel combinaton, and to so arrange the valve mechanism as to obtain the optimum relationship between energy required vs. r.p.m. and energy available vs. r.p.m. In the latter case it will often be found that existing engines without compression relief can very satisfactorily take lighter flywheels when provided with the compression relief expedient of this invention.

The particular mechanism illustrated in FIGURE 2 has a characteristic which may be objectionable in some cases (notably in an engine that does not have a governor) and which is fully overcome by the arrangement illustrated in FIGURES 10 and 11.

If a single cylinder engine embodying the arrangement shown in FIGURE 2 is started, and its throttle is closed almost immediately after the engine starts, so as to cause the engine to idle, the engine may run at a speed as low as 900 to 1000 r.p.m. But if the same engine is running at full speed and its throttle is closed, it will then run at the more normal idling speed of 1500–1800 r.p.m. Should the engine then be slowed down substantially, as because of the imposition of a load upon it, or due to a miss, it will drop down to and maintain the low idling speed of 900–1000 r.p.m.

Thus an engine embodying the FIGURE 2 arrangement can have two idling speeds at its idling throttle setting. The lower of these two speeds (900–1000 r.p.m.) may be so low that acceleration is poor when the throttle is opened, owing to the fact that the mixture is too lean inasmuch as small engines are not usually provided with an acceleration pump or the like.

This duality of idling speeds results in part from the relationship between intake manifold pressure and combustion chamber pressure under idling throttle conditions, and in part from inertia of the intake valve.

When an engine is running with its throttle in the idling position, pressure in the intake manifold at the beginning of the compression stroke is substantially below atmospheric pressure. Pressure in the combustion chamber at that point is likewise subatmospheric, and in fact is slightly below that in the intake manifold. Intake manifold pressure rises during the compression stroke, and while it does not rise as rapidly as pressure in the combustion chamber, the pressure differential across the intake valve through most of that part of the compression stroke in which the piston is accelerating is incapable of actuating the valve towards its seat. When the engine is running very slowly, the valve can therefore remain at the upper limit of its free travel, occupying the positions denoted by curve H in FIGURE 3a. Under these conditions, the pressure differential necessary to close the valve is not attained until about the point of maximum piston velocity. The leakage of charge out of the combustion chamber by which valve closure is then effected, while not large in absolute terms, is large in proportion to the total charge in the chamber, and the combustible charge remaining therein when ignition occurs is only enough to enable the engine to run very slowly.

It might be noted parenthetically that the conditions just described do not exist during cranking, because the piston then moves slowly enough in its intake stroke to draw a substantial charge into the combustion chamber, and more especially because the engine is usually cranked with the throttle open.

When an engine embodying the FIGURE 2 arrangement is operating at its normal running speed, its intake valve is fully inertia responsive, that is, the valve moves rapidly enough in its closing motion (see curve H in FIGURE 3a between cam angles of 210° and 235°) so that its own momentum carries it all the way down through its free travel range. As the engine is slowed down, the valve remains fully inertia responsive down to slightly below its normal idling speed of 1500–1800 r.p.m. With the engine idling at the faster speed, the valve moves directly to the lower limit of its free travel range at about the 235° to 240° cam angle, and thereafter occupies the positions designated by curve F in FIGURE 3a. When this happens, very little of the charge in the combustion chamber is permitted to escape during the compression stroke, and the engine continues to run at its normal idling speed.

The engine speed at which the valve becomes fully inertia responsive is thus critical to good idling performance. If the intake valve is not fully inertia responsive until the engine runs at, say, at least 1500 r.p.m., there is the possibility that the engine will have the dual idling range characteristic described above, since the engine will be capable of normal idling at speeds above 1500 r.p.m. but will tend to idle very slowly whenever it is brought down below the minimum r.p.m. at which its valve is fully inertia responsive.

Desirably the valve should become fully inertia responsive at an engine speed that is well below normal idling but is somewhat above the r.p.m. at which the kinetic energy of the flywheel is sufficient to compress a full charge, i.e., the r.p.m. denoted by the intersection of the curves for the engine that correspond to curves A and B in FIGURE 1.

Permitting the valve to be fully inertia responsive at speeds above about 900 r.p.m. while causing it to be responsive to gas escape rates at lower speeds entails an apparent conflict of requirements. To enable the valve to be fully inertia responsive at such low speeds, the friction force that opposes its motion must be low; whereas a substantially higher friction force on the valve is needed to render it properly responsive to pressure differentials across its head. This seeming conflict is nicely resolved in the FIGURES 10 and 11 mechanism, whereby a biasing force high enough to render the valve properly pressure differential responsive is imposed upon the friction pad 26 during at least that portion of the compression stroke from about the point of maximum piston velocity to the point at which the valve is mechanically forced onto its seat that is, from at least about the 270° cam angle through the 297° cam angle, but a substantially lighter biasing force is imposed upon the friction pad during the remainder of the engine cycle, and particularly during the critical period of intake valve closure between about the 230° and 255° cam angles.

In the FIGURES 10 and 11 arrangement the cam 13 which comprises a part of the actuating mechanism for the intake valve 9 cooperates with a leaf spring member 41 to provide the different values of biasing force upon the friction pad that are needed in different parts of the engine cycle, but it is to be observed in this respect that the shape of the cam is dictated solely by considerations of valve motion and position and need not be modified or influenced in any way by provision for the desired cooperation with the leaf spring member 41.

As shown in FIGURES 10 and 11, instead of the friction pad 26 being biased by means of a helical spring, it is biased solely by means of the leaf spring member 41. In all other respects the valve actuating mechanism—comprising the cam 13, the tappet 15, the valve spring 12, the valve 9, and the spring retainer 18—is identical with that illustrated in FIGURE 2.

The leaf spring member 41 is generally tridentate, having a long central leg 42 flanked by shorter outer legs 43, the three legs extending downwardly from a transverse body portion 44.

The upper part of the spring member 41, comprising the body portion 44 and its shorter outer legs 43, is disposed in the valve spring chamber 31; and the lower portion of its central leg 42 projects down into the crankcase of the engine, for engagement with the intake valve cam 13, through a hole 45 in the bottom wall 46 of the valve spring chamber. The hole 45 also provides for crankcase breathing.

The friction pad 26 is engaged by the upper end of the central leg 42, near the connection of said leg with the transverse body portion 44 of the spring member. The free lower end portions of the outer legs 43 are formed as short feet 47 which at all times bear flatwise against the inner surface of the removable cover member 34 for the valve spring chamber, the outer legs being flexingly bowed away from said cover plate.

During most of the engine cycle a portion of the central leg 42 that is a short distance below the tips of the outer legs 43 bears against the edge of the hole 45, which is formed as a knife edge to provide a fulcrum 48. Through most of the engine cycle, therefore, the shorter legs 43 react against the cover member 34 to urge the spring member about the fulcrum 48 in the direction to bias the friction pad toward the valve stem. But because the spring member as a whole is then operating as a third-class lever with a relatively small arm between its fulcrum 48 and the point of force application (the feet 47), the biasing force which it applies to the friction pad is a relatively light one.

The lower end portion of the central leg 42 of the spring member is disposed in such relationship to the inlet valve cam 13 that the lobe on the cam engages the spring member at about the 245° cam angle and rapidly swings the longer leg in the direction to carry it out of engagement with the fulcrum 48. When this happens, the spring member acts as a leaf spring that is medially fulcrumed about its feet 47. For application of the higher biasing force to the friction pad, the cam needs to carry the central leg 42 only a small distance from the fulcrum 48, inasmuch as the flexing forces of the spring member are exerted through oppositely acting lever arms of roughly equal length, the feet 47 being about halfway between the opposite ends of the central leg.

The central leg of the spring member is carried to its maximum distance from the fulcrum 48 in the course of about 10° of cam rotation, and it remains in that position, to steadily apply the higher value of biasing force to the friction pad, until somewhere in the neighborhood of top dead center of the compression stroke. The exact point at which the cam is disengaged from the spring member to restore friction pad bias to its lower value is not critical, so long as this occurs after the valve is mechanically forced onto its seat (297° cam angle) and does not occur too late in the power stroke to interfere with proper suction relief in the event the charge is not ignited. It will be apparent that the timing, duration and value of the higher biasing force can be controlled by the curvature and disposition of the bottom portion of the spring member, and it will also be observed from what has been said above that no critically small tolerances must be maintained with the FIGURES 10 and 11 structure.

It will be observed that the leaf spring member 41 operates, in effect, as a pair of spring elements, the first of which comprises the shorter legs 43 in cooperation with only the upper portion of the central leg 42, and the second of which comprises the whole of the central leg in cooperation with the shorter legs.

Curve D' in FIGURE 1 shows the relationship of energy required through the compression stroke to r.p.m. at the beginning of the compression stroke for an engine embodying the arrangement illustrated in FIGURES 10 and 11. Up to about 600 or 650 r.p.m., curve D' is of course identical with curve D. At about 650 r.p.m. the intake valve starts to become inertia responsive, that is, inertia carries it through a portion of its free travel range at about the 245° cam angle, and therefore it can subsequently be moved toward its seat, through the remainder of its free travel range, by gas escaping at lower rates than it would respond to at speeds below 600 r.p.m. As r.p.m. is increased, through speeds in the range of 650 r.p.m. to about 950 r.p.m., the valve becomes more and more inertia responsive, that is, it moves by momentum through more and more of its free travel range at around the 245° cam angle, and can be subsequently driven the rest of the way towards its seat by gas escaping at lower and lower rates. Finally, at all speeds above about 950 r.p.m. the valve is fully inertia responsive, that is, it is carried all the way through its free travel range solely by momentum. Hence from about 950 r.p.m. upwards the engine behaves like one with a heretofore conventional valve arrangement so that from about 950 r.p.m. upwards its curve of energy required through the compression stroke closely follows curve B in FIGURE 1.

As pointed out hereinabove, the rate of gas escape at which the valve is moved towards its seat depends upon valve gap (distance between the valve and its seat) and upon the value of the force with which movement of the valve towards its seat is yieldingly opposed. The two above described embodiments of the invention exemplify the expedient of controlling the critical value of rate of gas escape for valve closure by controlling the valve gap. In the embodiment of the invention illustrated in FIGURES 13 and 14, the force which yieldingly opposes closing motion of the valve is varied during the compression stroke while the valve gap is maintained at a constant value until the instant of valve closure.

The valve 9' of the FIGURES 13 and 14 embodiment is illustrated as being a special compression relief valve that is provided in addition to the normal inlet and exhaust valves. (The inlet and exhaust valves can be conventional in all respects and are therefore not shown.) Through the seat 16' for the valve 9' the combustion chamber of the engine is communicable with a zone outside the same, as for example an intake manifold 4.

The actuating mechanism for the valve 9' comprises a cam 13', an upper spring 112 which tends to bias the valve 9' towards its seat, and a lower spring 212 which cooperates with the cam 13' to apply to the valve a variable biasing force in the direction away from its seat.

The cam 13' is separate from the cams which actuate the inlet and exhaust valves, but it can be on the same shaft with them. It is to be observed that the cam 13' does not effect any direct actuation of the valve 9' but merely controls the biasing force applied thereto.

The valve 9' has an enlarged head 10 at its top and a downwardly projecting stem 11 which is suitably guided in the engine body for reciprocation. Again, actual orientation of the valve is not critical.

Secured to the under side of the valve stem 11 is a spring retainer 18' that has upwardly and downwardly projecting circumferential flanges 61 and 62. The upper spring 112 reacts between the upper surface of this spring retainer and the bottom of a downwardly opening shallow well 63 in a fixed part of the engine body. The lower spring 212 reacts between the underside of the spring retainer 18' and the top of an enlarged head 19' on a tappet 15' that cooperates with the cam 13'. The tappet is guided in a fixed part of the engine body for reciprocating motion coaxially with the valve.

During most of the engine cycle a fixed radius portion 65 of the cam is presented to the tappet, and at these times, as illustrated in FIGURE 13, the cam is ineffective to impart any lift to the tappet because the enlarged head 19' on the tappet is bottomed on a fixed part of the engine body and there is a small clearance between the tappet and the cam. Under these conditions the force exerted by the lower spring 212 is less than that exerted by the upper spring 112, so that the latter tends to maintain the valve engaged with its seat. The valve can of course be sucked off of its seat during an unfired power stroke, in accordance with principles explained above.

Early in the compression stroke, just before normal full closure of the inlet valve, a lobe 66 on the cam 13' comes into engagement with the tappet and rapidly lifts the tappet to compress the lower spring 212. By about the 235° cam angle the tappet is fully lifted, and the force of the lower spring 212 overcomes that of the upper spring 112, so that if combustion chamber pressure is low enough, the valve is raised off its seat as illustrated in FIGURE 14. The tappet remains in this fully raised position to about the 275° cam angle.

During the period in which the tappet is thus fully raised, the valve can close in response to gas escaping from the combustion chamber at a rate such that the force exerted thereby on the head 10 of the valve is equal to or greater than the differential between the opposing forces exerted upon the valve by the springs 112 and 212. Until pressure in the combustion chamber reaches the value at which gas escapes through the valve seat 16' at this critical rate, the valve remains a constant small distance from its seat (on the order of .012" to .016"), this valve gap being established by engagement of an upwardly facing shoulder 67 on the spring retainer 18' against the bottom of the well 63 in the engine body.

From about the 275° cam angle to about the 297° cam angle a tapering ramp portion 68 on the cam 13' is engaged with the tappet, and the tappet gradually returns to its bottomed position shown in FIGURE 13, which position it attains just prior to the instant of ignition. As the tappet moves down, the lower spring 212 naturally exerts a steadily diminishing force upon the valve. Just before the tappet bottoms, the forces which the two springs exert upon the valve come into equilibrium, and when the tappet bottoms the valve is once again positively urged onto its seat under the biasing force of the upper spring 112.

During the period of downward movement of the tappet along the ramp 68, while the net upward biasing force upon the valve is steadily diminishing, the valve can close in response to lower and lower rates of gas escape. As a result, peak pressure in the compression stroke for any r.p.m. at the beginning of that stroke will lie substantially along curve D in FIGURE 1.

With the arrangement illustrated in FIGURES 13 and 14 the valve gap (i.e., the distance between the valve head and its seat) may be somewhat critical in some cases, inasmuch as the orifice through which compression is relieved maintains a constant effective area during that portion of the compression stroke in which the piston is decelerating relative to the crankshaft. Hence the valve gap must not be too large, otherwise pressure in the combustion chamber will decline after the piston passes its point of highest velocity relative to the crankshaft, especially during slow cranking, inasmuch as the unchanging orifice provided by the open valve will then leak off pressure faster than the decelerating piston builds it.

The arrangement illustrated in FIGURES 13 and 14 might also cause undesirably slow idling in certain types of engines, for reasons explained above, especially if the combustion chamber is vented to the intake manifold through the orifice defined by the seat 16' of the valve. However those skilled in the art will recognize immediately that there can be a simple solution to this problem, inasmuch as the cam 13' can be shifted axially by means of a governor mechanism of known type, to carry the cam out from under the tappet at engine speeds of about 900 r.p.m. and upwards, thereby effectively disabling the compression relief mechanism so that the valve remains closed whenever the engine is running under its own power.

From the foregoing description taken together with the accompanying drawings it will be apparent that this invention provides a method and means for effecting compression relief in internal combustion engines in such a manner and to such an extent as to reduce the work required for starting such an engine to a heretofore unprecedented miniumm, and, moreover, to enable a substantially uniform cranking torque to be applied all through the engine cycle so that manual starting of the engine can be accomplished with the utmost convenience, and so that the provision of a very small and inexpensive self-starter becomes feasible.

What is claimed as my invention is:

1. The method of facilitating starting of an internal combustion engine having a combustion chamber, a piston which is connected with a crankshaft and which reciprocates through a cycle that includes a compression stroke during which the piston first accelerates and then decelerates relative to the crankshaft, and having means providing for escape of gas from the combustion chamber during the compression stroke to relieve pressure on the piston during starting, which method is characterized by:
    (a) substantially terminating escape of gas from the combustion chamber whenever, during the compression stroke, the rate of escape of gas from the combustion chamber attains a critical value that depends upon the portion of the compression stroke in which the piston is moving, said critical value decreasing through the compression stroke relative to the ratio of piston velocity to crankshaft velocity; and
    (b) throughout the time in each compression stroke during which gas is permitted to escape from the combustion chamber, so controlling the rate of escape of gas as to insure a continuous increase in pressure in the combustion chamber all through the compression stroke.

2. The method of claim 1 further characterized by:
said critical value of rate of escape of gas from the combustion chamber
    (a) being substantially constant during the portion of the compression stroke in which the piston accelerates relative to the crankshaft; and
    (b) during the remainder of the compression stroke decreasing more rapidly than the piston decelerates relative to the crankshaft so as to approach zero before the piston reaches the end of the compression stroke.

3. The method of claim 1, further characterized by:
substantially preventing escape of gas from the combustion chamber all during the compression stroke whenever the engine is running at no less than a predetermined speed which is substantially below its intended minimum idling speed but is high enough so that the engine can continue to run.

4. The method of facilitating starting of an internal combustion engine having a crankshaft which must be rotatably driven in order to start the engine, a combustion chamber with an orifice therein through which gas can escape for compression relief, a piston connected with the crankshaft and which reciprocates through a cycle that includes a compression stroke during which the piston compresses gas in the combustion chamber and during which the piston first accelerates and then decelerates relative to the crankshaft, and means for igniting gas in the combustion chamber at a predetermined point in motion of the piston, which method is characterized by:
    (a) so controlling the effective area of said orifice as
        (1) to cause pressure in the combustion chamber to rise continuously through every compression stroke; and
        (2) to bring the effective area of said orifice to substantially zero before the piston reaches the end of the compression stroke and no later than said point at which igntion is intended to occur; and
    (b) substantially closing said orifice whenever during a compression stroke the rate at which gas escapes from the combustion chamber through said orifice attains a critical value, which critical value depends upon the portion of the compression stroke in which the piston is moving and decreases through the compression stroke relative to the ratio of piston velocity to crankshaft velocity so that the energy required through the compression stroke for compression of gas remaining in the combustion chamber is no greater than the kinetic energy of moving engine parts available at the beginning of the compression stroke.

5. The method of claim 4, further characterized by:
said critical value of rate of escape of gas through said orifice being
    (a) substantially constant during acceleration of the piston relative to the crankshaft; and
    (b) thereafter decreasing more rapidly than the piston decelerates relative to the crankshaft.

6. The method of claim 4, wherein the engine has an intake manifold communicable with the combustion chamber through said orifice, further characterized by:
    whenever the engine is running at no less than a predetermined speed which is substantially below its intended minimum idling speed but is high enough so that the engine can continue to run, substantially closing said orifice at about the point in the compression stroke of the piston at which the inlet valve of the engine normally closes during high speed running, and maintaining said orifice substantially closed through the remainder of the compression stroke.

7. In an internal combustion engine having a crankshaft that must be rotatably driven in order to start the engine, a combustion chamber, a piston connected with the crankshaft and reciprocable through a cycle that includes a compression stroke during which the piston first accelerates and then decelerates relative to the crankshaft, and means for igniting gases in the combustion chamber at a predetermined point in the motion of the piston, means for facilitating starting of the engine comprising:
    (a) orifice means providing an outlet from the combustion chamber through which gas can escape during the compression stroke of the piston;
    (b) gas flow actuatable valve means operable to substantially close said outlet in response to flow of gas through said orifice means; and
    (c) means connected with the piston and operatively associated with said valve means for so controlling response of the valve means to rate of flow of gas through said orifice means that the valve means is actuated to its substantially closed position upon attainment of a critical value of rate of flow of gas through said orifice means, which critical value depends upon the position of the piston in the compression stroke and decreases through the compression stroke relative to the ratio of piston velocity to crankshaft velocity, said critical value approaching zero at a point in piston travel which precedes the end of the compression stroke and is no later than said point in piston motion at which ignition is intended to occur.

8. The internal combustion engine of claim 7, further characterized by:
 (a) said gas flow actuatable valve means comprising a poppet valve;
 (b) said means connected with the piston comprising valve actuating mechanism; and
 (c) further characterized by means providing a lost motion connection between said valve actuating mechanism and said poppet valve whereby the latter is rendered gas flow actuatable.

9. The internal combustion engine of claim 8 wherein said outlet from the combustion chamber is defined by a seat for the poppet valve, further characterized by:
 (a) said valve actuating mechanism providing for the poppet, when at the limit of its lost motion travel remote from said seat,
  (1) to be at a substantially constant small distance from said seat through the latter part of compression stroke relative piston acceleration so that the poppet permits controlled escape of gas from the combustion chamber at a rate that insures continually increasing pressure of gas in said chamber through the compression stroke; and
  (2) to be moved toward the seat during compression stroke piston relative deceleration at a rate higher than that of piston relative deceleration and which insures engagement of the poppet with the seat before the piston reaches the end of the compression stroke and no later than said point at which ignition is intended to occur, to thus insure further steadily increasing pressure of gas in said chamber; and
 (b) further characterized by means for at all times imposing upon the poppet a force which yieldingly opposes motion thereof.

10. The internal combustion engine of claim 9, further characterized by:
 said last named means being arranged to impose upon the poppet valve a force opposing motion in the opening direction thereof which is greater than the force opposing motion of the valve in its closing direction.

11. The internal combustion engine of claim 9 wherein said last named means comprises:
 (a) a friction block constrained to motion toward and from the valve stem; and
 (b) spring means maintaining the friction block engaged with the valve stem under bias.

12. The internal combustion engine of claim 11, further characterized by:
 said friction block and the portion of the valve stem surface engaged thereby being so arranged relative to one another that the friction block imposes greater friction on the valve when the latter moves in its opening direction than when it moves in its closing direction.

13. The internal combustion engine of claim 11 further characterized by:
 means arranged for cooperation with the spring means and with a part of the engine that is connected with the piston for varying the biasing force that the spring means imposes upon the friction block.

14. The internal combustion engine of claim 11 wherein said valve means is the inlet valve of the engine and said valve actuating mechanism comprises cam means driven by the crankshaft, further characterized by:
 said spring means comprising a leaf spring member having spaced apart portions reacting between the friction block and fixed parts of the engine for imposing upon the friction block a biasing force of a predetermined low value during most of the engine cycle, said leaf spring member also having a portion remote from the friction block and adjacent to the cam means to be engaged by the cam means during a substantial part of the compression stroke to exert upon the friction block a biasing force of higher value.

15. The internal combustion engine of claim 9, wherein said poppet is the inlet valve, further characterized by:
 said last named means being operatively associated with a part of the engine that is connected with the piston for motion in timed relation thereto and whereby the valve of the yieldingly force which said last named means imposes upon the poppet is caused to have a low value during the initial part of compression stroke piston acceleration so that at high engine speeds the valve can then move through its lost motion travel towards its seat under its momentum, and is caused to have a higher value in other portions of the compression stroke so that at engine cranking speeds the valve moves towards its seat through its lost motion travel in response to the attainment of said critical value of rate of flow of gas through said orifice means.

16. The internal combustion engine of claim 7, wherein said valve means comprises a poppet and wherein said outlet from the combustion chamber is defined by a seat for said poppet, further characterized by:
 (a) means at all times biasing the poppet toward the seat with a force of a predetermined value;
 (b) cooperating abutment means on the poppet and on a fixed part of the engine limiting motion of the poppet away from the seat to a predetermined small distance; and
 (c) further characterized by said means connected with the piston comprising:
  (1) a cam which moves cylically in timed relation to piston reciprocation;
  (2) a cam follower cooperable with said cam; and
  (3) a spring reacting between said cam follower and the poppet for biasing the poppet away from its seat nad which is capable of exerting a biasing force of more than said predetermined value.

17. An internal combustion engine having a combustion chamber, a piston connected with a crankshaft and reciprocable through a cycle that includes a compression stroke during which the piston first accelerates and then decelerates relative to the crankshaft, a poppet valve cooperable with a seat for controlling the flow of gases between the combustion chamber and a manifold, and means for igniting gas in the combustion chamber at a predetermined point in piston motion, said engine being characterized by:
 (a) actuating means for effecting movement of the valve toward and from its seat in timed relation to piston reciprocation, said actuating means providing for the valve
  (1) to be at a substantially constant small distance from its seat through the latter part of compression stroke piston acceleration so that the valve permits controlled escape of gas from the combuston chamber at a rate that insures steadily increasing pressure of gas in said chamber; and
  (2) to be moved toward its seat during compression stroke piston deceleration at a rate which insures engagement of the valve with its seat before the piston reaches the end of its compression stroke and no later than said point of ignition, to insure further steadily increasing pressure of gas in said chamber;

(b) means providing a lost motion connection between the valve and said actuating means whereby the valve is rendered responsive to flow of gas out of the combustion chamber through the seat to move towards the seat through substantially said small distance from any position in which the actuating means tends to establish it; and (c) means yieldingly opposing motion of the valve towards its seat so that during the compression stroke the valve substantially engages its seat independently of the actuating means whenever the rate of flow of gas out of the combustion chamber through the seat attains a critical value that depends upon the distance between the valve and the seat.

18. The internal combustion engine of claim 17, further characterized by:
means yieldingly opposing motion of the valve away from its seat to prevent undesired motion of the valve relative to the actuating means during high speed running of the engine.

19. The internal combustion engine of claim 18 wherein said means yieldingly opposing motion of the valve toward and from its seat comprises:
(a) a friction block constrained to motion toward and from the valve stem;
(b) spring means reacting between the friction block and a relatively stationary part of the engine to maintain the friction block engaged with the valve stem under bias; and
(c) the portion of the valve spring engaged by the friction block having its surface obliquely inclined with respect to the valve axis in the direction to cause the fricion block to exert greater friction upon the valve when the latter is moving in its opening direction than when it is moving in its closing direction.

20. The internal combustion engine of claim 18 wherein said means yieldingly opposing motion of the valve toward and from its seat comprises:
(a) a friction block constrained to motion toward and from the valve stem;
(b) first spring means reacting between the friction block and a relatively stationary part of the engine to maintain the friction block engaged with the valve stem under a biasing force of a predetermined value; and
(c) second spring means operatively associated with the actuating means for the valve and with the friction block for imposing upon the friction block a biasing force of a higher predetermined value during a substantial portion of the compression stroke.

21. In an internal combustion engine having a combustion chamber, a reciprocable piston, valves for controlling the flow of combustible gas into the combustion chamber and of spent gas therefrom, actuating means for opening and closing said valves in timed relation to reciprocation of the piston, and means providing a lost motion connection between one of said valves and the actuating means therefor so as to render said valve responsive to pressure of gas in the combustion chamber; friction means connected between said one valve and a fixed part of the engine for at all times yieldingly opposing motion of said one valve.

22. The internal combustion engine of claim 21 wherein said one valve is the inlet valve, further characterized by:
means connected with said friction means and with the valve actuating means for causing the friction means to oppose motion of said one valve with a yielding force which has one value through a portion of the compression stroke, and has a lower value in other portions of the engine cycle.

23. In an internal combustion engine having a combustion chamber, a piston reciprocable through a cycle that includes a compression stroke, and an orifice through which gas can escape from the combustion chamber during the compression stroke to relieve compression:
(a) a valve for controlling flow of gas through said orifice;
(b) actuating means for opening and closing said valve in timed relation to reciprocation of the piston;
(c) means providing a lost motion connection between said actuating means and said valve whereby said valve is rendered responsive to flow of gas out of the combustion chamber through said orifice; and
(d) means connected between said valve and a fixed part of the engine for at all times effecting yielding frictional resistance to motion of said valve.

24. The internal combustion engine of claim 23 wherein said valve is the inlet valve, further characterized by:
means connected between said valve and a part of the engine that moves in timed relation to piston reciprocation for effecting additional yielding frictional resistance to motion of said valve during a part of the compression stroke.

25. In an internal combustion engine having a combustion chamber, a piston reciprocable through a cycle that includes a compression stroke, an inlet poppet valve for controlling communication between an intake manifold and the combustion chamber, actuating means for said valve comprising a cam and a spring, and means providing a lost motion connection between said valve and the actuating means whereby the valve can have limited motion relative to the actuating means at times in the engine cycle when the valve is not maintained seated by the actuating means:
(a) a friction block slideable toward and from friction producing engagement with the stem of the valve; and
(b) an elongated leaf spring member having opposite end portions that are respectively arranged for cooperation with the friction pad and with said cam and having a medial portion engageable with a fixed part of the engine to be fulcrumed thereby, said spring member being cooperable with the cam to bias the friction block against the valve stem in a predetermined portion of the engine cycle.

26. In an internal combustion engine having a body that defines a combustion chamber, a valve seat, a crankcase, and a valve spring chamber separated from the crankcase by a wall, a piston reciprocable in the body, an inlet poppet valve having a head movable toward and from engagement with the valve seat and having a stem which extends into said spring chamber, means for actuating said valve toward and from its seat in timed relation to piston reciprocation comprising a cam in the crankcase and a spring in said spring chamber, means providing a lost motion connection between the valve actuating means and said valve whereby the valve can have limited motion relative to the actuating means at times in the engine cycle when the valve is not maintained seated by the actuating means, and a removable cover for the spring chamber:
(a) a friction pad slideable in a bore in the body toward and from engagement of one of its ends with the stem of said valve, the other end of said friction pad being in said spring chamber; and
(b) a tridentate leaf spring member having an elongated central leg which projects through a hole in said wall and is flanked by shorter outer legs, and having a transverse body portion from which the three legs extend,
(1) a portion of the central leg near the body portion being at all times engaged with said other end of the friction pad;
(2) the ends of the shorter legs remote from the body portion being at all times engaged under flexing bias with the cover for the valve spring chamber;

(3) the portion of the longer leg remote from the body member being disposed adjacent to the cam for engagement thereby during a predetermined portion of the engine cycle, such engagement imposing upon the friction pad a biasing force in the direction of the valve stem that has one value; and (4) a medial portion of the central leg being engageable with the edge of said hole during the remaining portions of the engine cycle to cooperate with the shorter legs in imposing upon the friction pad a biasing force in said direction that has a lower value.

27. In an internal combustion engine having a piston reciprocable through a cycle and a popper valve:

(a) a friction pad movable toward and from friction producing engagement with the stem of the poppet valve; and (b) force applying means arranged for cooperation with the friction pad and comprising a part that is movable in timed relation to motion of the piston for imposing upon the friction pad during a predetermined portion of said cycle a biasing force of a predetermined value and which is in a direction to engage the friction pad with the stem of the poppet valve.

28. The internal combustion engine of claim 27 further characterized by:

other force applying means arranged for cooperation with a fixed part of the engine, for imposing upon the friction pad during the remainder of said cycle a biasing force in said direction which is of a different value.

29. In an internal combustion engine having a poppet valve to control the admission of fuel mixture to the combustion chamber of the engine:

(a) actuating means for moving the poppet valve toward and from its seat, said actuating means comprising cam means that rotates through a cycle;

(b) means providing a lost motion connection between said actuating means and the poppet valve so that the poppet valve has limited freedom of motion with respect to its actuating means;

(c) a friction pad to bear against a portion of the poppet valve and yieldingly resist movement of the valve with an effectiveness that depends upon the force with which the friction pad is pressed against said part of the poppet valve; and (d) spring means operatively connected between the friction pad and the cam means to yieldingly press the friction pad against the poppet valve with a force that differs in different parts of the cycle of the cam means.

30. The internal combustion engine of claim 29, further characterized by:

said spring means comprising a leaf spring medially fulcrumed on a fixed part of the engine and having one end portion positioned to bear against the friction pad and its other end portion positioned to be engaged by the cam means.

31. In an internal combustion engine having a body that defines a combustion chamber, and a piston reciprocable in the combustion chamber through a cycle that includes a compression stroke during which the piston first accelerates and then decelerates relative to a crankshaft with which it is connected:

(a) means in the body defining an outlet from the combustion chamber and a valve seat through which said outlet opens;

(b) a poppet valve having a head cooperable with said valve seat, said poppet valve being constrained to sliding movement in the body through a defined small distance toward and from engagement of its head with the valve seat;

(c) first spring means reacting between the body and the poppet valve to bias the poppet valve towards the seat;

(d) a cam follower movably mounted in the body;

(e) second spring means reacting between the cam follower and the poppet valve and arranged for biasing the poppet valve away from the seat; and (f) cam means connected with the crankshaft for cyclical motion in timed relation to piston reciprocation, said cam means cooperating with the cam follower during the compression stroke to cause the second spring means to impose upon the poppet valve a biasing force which is of a substantially constant value and greater than that exerted by the first spring means during that portion of the compression stroke in which the piston accelerates relative to the crankshaft, and which thereafter diminishes more rapidly than the piston decelerates so as to reach equilibrium with the biasing force exerted by the first spring before the piston reaches the end of the compression stroke.

References Cited

UNITED STATES PATENTS

| | | | |
|---|---|---|---|
| 1,254,104 | 1/1918 | Wygodsky | 123—182 |
| 1,579,985 | 4/1926 | Wheeler | 123—182 |
| 1,673,478 | 6/1928 | Addyman et al. | 123—90 |
| 2,999,491 | 9/1961 | Harkness | 123—182 |
| 3,306,276 | 2/1967 | Harkness et al. | 123—182 |
| 3,307,527 | 3/1967 | Weglage et al. | 123—182 |

WENDELL E. BURNS, *Primary Examiner.*